United States Patent
Phelps et al.

(10) Patent No.: US 12,316,117 B2
(45) Date of Patent: May 27, 2025

(54) CONTROL CENTER FOR USE WITH PHOTOVOLTAIC AND OTHER DC POWER SOURCES

(71) Applicant: Vroom Solar Inc., Springfield, MO (US)

(72) Inventors: Luke Phelps, Springfield, MO (US); Ryan Konen, Shawnee, KS (US); Tim Stark, Blue Springs, MO (US); James Bartley, Nixa, MO (US)

(73) Assignee: Vroom Solar Inc., Springfield, MO (US)

( * ) Notice: Subject to any disclaimer, the term of this patent is extended or adjusted under 35 U.S.C. 154(b) by 8 days.

(21) Appl. No.: 18/349,528

(22) Filed: Jul. 10, 2023

(65) Prior Publication Data
US 2024/0014652 A1 Jan. 11, 2024

Related U.S. Application Data

(60) Provisional application No. 63/388,018, filed on Jul. 11, 2022.

(51) Int. Cl.
*H02J 3/00* (2006.01)
*H02J 3/38* (2006.01)

(52) U.S. Cl.
CPC ............ *H02J 3/007* (2020.01); *H02J 3/381* (2013.01); *H02J 2203/10* (2020.01); *H02J 2300/26* (2020.01)

(58) Field of Classification Search
CPC ........ H02J 3/007; H02J 3/381; H02J 2300/26; H02J 2203/10
See application file for complete search history.

(56) References Cited

U.S. PATENT DOCUMENTS

| | | | |
|---|---|---|---|
| 5,522,943 A | 6/1996 | Spencer et al. | |
| 8,587,251 B2* | 11/2013 | Nakashima | H02J 3/381 |
| | | | 320/120 |
| 8,624,439 B2 | 1/2014 | Marcianesi et al. | |
| 8,704,654 B1 | 4/2014 | Krasowski et al. | |
| 9,088,169 B2 | 7/2015 | Anderson | |
| 9,716,405 B2 | 7/2017 | Gramm | |
| 10,033,189 B2* | 7/2018 | Fujii | H02M 7/539 |

(Continued)

OTHER PUBLICATIONS

International Search Report and Written Opinion for PCT/US2023/027238 dated Dec. 13, 2023.

*Primary Examiner* — Carlos Amaya
(74) *Attorney, Agent, or Firm* — SLEMAN & LUND LLP

(57) ABSTRACT

A power controller system and method for monitoring available power from an input power source, such as one or more photovoltaic ("PV") cells/panels, and controlling power output to one or more loads. A predetermined threshold input voltage value is assigned to the system. Using the predetermined value, the system determines whether there is enough available power to power the load by measuring only input voltage. In the event the input voltage is greater than the threshold voltage value, then the system delivers power to the load. In the event the load is greater than the available power, the input voltage will drop below the threshold voltage and the system stops delivering power to the load. Power to the loads may be prioritized based on available power so the system turns ON and OFF power to different loads in a particular order.

20 Claims, 6 Drawing Sheets

(56) References Cited

U.S. PATENT DOCUMENTS

| | | | |
|---|---|---|---|
| 2007/0097569 A1 | 5/2007 | Huang | |
| 2009/0230783 A1 | 9/2009 | Weed et al. | |
| 2009/0302681 A1* | 12/2009 | Yamada | H02J 7/35 |
| | | | 700/286 |
| 2011/0221273 A1* | 9/2011 | Thompson | H02J 3/381 |
| | | | 307/43 |
| 2011/0254372 A1* | 10/2011 | Haines | H02J 9/062 |
| | | | 307/66 |
| 2014/0028241 A1 | 1/2014 | Hixson | |
| 2014/0330441 A1 | 11/2014 | De Castro et al. | |
| 2021/0218261 A1 | 7/2021 | Kofman et al. | |
| 2022/0037898 A1* | 2/2022 | Onoda | H02J 3/32 |

\* cited by examiner

CONTROL CENTER FOR USE WITH PHOTOVOLTAIC AND OTHER DC POWER SOURCES

This application is based upon U.S. Provisional Application Ser. No. 63/388,018 filed Jul. 11, 2022, the complete disclosure of which is hereby expressly incorporated by this reference.

BACKGROUND

Embodiments of the present disclosure generally relate to systems for controlling power to one or more electrical loads. More specifically, embodiments of the present disclosure relate to systems for controlling the availability of output power to one or more loads based on whether demand output power for a load exceeds the available input power from one or more photovoltaic panels or other DC power sources.

There is often a need to provide electrical power to alternating current (AC) loads in remote areas where the electric power grid is not reliable or available. The electrical AC loads may include a storage battery, a power outlet, an electrical tool, an air conditioner or heater, a charger for electrical vehicles, or the like. This situation may occur at a building construction site where electric power service has not yet been provided. The situation may also occur in countries where the infrastructure for providing electrical power does not exist. It may also be desirable to provide an alternate source of electrical power in the aftermath of a disaster such as a storm, earthquake or other catastrophe causing damage to the electrical generation and distribution infrastructure. Needs for a power source may similarly arise at other remote locations such as major special events, concerts, and at remote cabins and campsites.

Photovoltaic (PV) cells or panels are one form of an alternative energy source which generate a direct current (DC). Other sources include wind power and hydraulic power. The voltage from the PV panels (referred to herein as "input power" or "available power") is typically combined with a power controlling unit, comprising an inverter for changing the DC voltage to AC voltage in order to power the load (referred to herein as "output power"). In the case of the photovoltaic panels, for example, the amount of power that can be extracted from the photovoltaic array depends on the conditions of radiation or sunlight, i.e. the amount of solar energy striking the panels or cells. Herein, the term "irradiance" will be used to describe the amount of solar energy striking the solar cells. As the solar irradiance diminishes, the input power that can be extracted from the photovoltaic array diminishes. Of course, there are other factors which affect the efficiency of power conversion using PV cells, including temperature, however, this disclosure will focus on irradiance as the primary factor. The sunlight versus time curve is ideally a substantially continuous and predictable curve. As the sun rises in the morning the irradiance curve increases to midday, after which the curve begins decreasing until the curve goes to zero as the sun sets. However, in reality, during the day when the sun is suddenly obscured by clouds and then reappears from behind the clouds, the amount of power radiated is unpredictably and significantly modified. The unpredictable nature of the sun's power negatively affects a PV cell's ability to produce electric power. It is particularly problematic in PV systems producing "on demand" power where the AC is being used to power a device for immediate use (as opposed to charging a battery).

All PV panels have a maximum power point (MPP) which is usually specified by the manufacturer. The MPP is the optimal conditions where the PV panels produce the most electricity. This MPP is affected by both the immediate environment like temperature and shading, as well as irradiance levels (the amount of solar radiation that hits the panel). Some existing power controlling units dynamically measure the voltage and current in a process called maximum power point tracking (MPPT). MPPT constantly tracks the panels' MPP and then adjust the panels' output to optimize performance. However, maximum power is not always relevant or required by the user. For example, many users may only need to know whether the PV panels can generate enough power for one or more specified functions. Further, MPPT systems are complicated and expensive.

There is therefore a need for an improved power controlling unit which overcomes these and other problems in the art.

SUMMARY

One aspect of the disclosure relates to a power controller system comprising a central processing unit (CPU) and a voltage testing unit configured to communicate with an input power source and the CPU. The voltage testing unit is configured to determine an input voltage available from the input power source. An inverter is used to convert DC voltage from the input power source to AC voltage. The CPU is programmed to determine whether the input voltage available from the input power source exceeds a predetermined threshold voltage value, and if so, the CPU is programmed to provide available power to one or more power output connections.

Another aspect of the disclosure relates to a method of monitoring an input voltage received from one or more input power sources and controlling power output to one or more power output connections. The method uses a power controller system having an inverter, a central processing unit (CPU), and one or more voltage testing units. The method includes assigning a predetermined threshold input voltage value and storing the predetermined threshold input voltage value in the CPU, then measuring an input voltage from the one or more input power sources. The system compares the input voltage to the predetermined threshold input voltage value to determine whether to turn ON power to the power output connection. Power is turned ON to the one or more power output connections if the input voltage exceeds the predetermined threshold input voltage value, and power is turned OFF to the one or more power output connections if the input voltage does not exceed the predetermined threshold input voltage value. In some embodiments the power controller system further includes a counter and the method further comprises turning power to the one or more power output connections ON after the input voltage is greater than the predetermined threshold input voltage value for at least a predetermined number of counts, wherein a first number of counts is assigned to a first input voltage and a second number of counts is assigned to a second input voltage. The first input voltage is larger than the second input voltage and the first number of counts is greater than the second number of counts. In some embodiments the one or more power output connections include a first power output connection having a first priority and a second power output connection having a second priority, the first priority is higher than the second priority and the method further comprising turning power to the first power output connection ON before turning power to the second power output connection ON.

Another aspect of the disclosure relates to a power controller system for monitoring available power from an input power source, such as one or more photovoltaic (PV) cells/panels, and controlling power output to one or more loads. The power controller system is configured to receive DC power from one or more input power sources, such as PV panels, and deliver AC power to one or more loads through one or more power output connections, such as electrical sockets. The system includes one or more inverters for converting the DC voltage from the input power source to AC voltage. The system includes a central processing unit (CPU), which may be a microcontroller unit (MCU) having a processor unit, memory modules, communication interfaces, and other components. One or more voltage testing units, such as volt meters, analog-to-digital converters (ADCs), or multimeters, are configured to determine the amount of input voltage available from the input power source. In some embodiments the MCU includes a voltage testing unit so that a separate component is not needed to perform this function. A predetermined minimum threshold input voltage value is assigned by the system or a user. In one embodiment the predetermined minimum input value is the number of Volts corresponding to the MPP of the input power source as assigned by the vendor/manufacturer. Using the predetermined value, the system can determine whether there is enough available power to power the load by measuring only input voltage. In the event the input voltage is greater than the minimum threshold voltage value, then the system continues to deliver power to the load. In the event that the load is greater than the available power, the input voltage will drop below the threshold voltage value exceeding the MPP and the MCU will instruct the system to stop delivering power to the load. Some embodiments of the power controller system may also include an indicator, such as colored LED lights, in communication with the MCU to visually indicate whether the input power source is currently providing enough power to power the load. Some embodiments of the power controller system may also include multiple sockets for providing power to different loads. The sockets may be prioritized based on available power (as determined by comparing the input voltage to the predetermined threshold voltage) so the MCU turns ON and OFF the sockets in a particular order. Some embodiments of the power controller system may also include a counter programmed to wait a predetermined number of counts before turning the AC output power back ON (after it has been turned OFF). In some embodiments the number of counts per unit of time (seconds or minutes) is dependent on the amount of available power. For example, when the system is trying to turn ON, a higher input voltage value provides more counts than a lower input voltage value such that the AC output power is turned ON faster when the system detects a higher input voltage value. In some embodiment the power controller system also turns outlets OFF based on available power, wherein the counter is programmed to wait a predetermined number of counts before turning the AC power OFF to one or more outlets. In these embodiments a lower input voltage value provides more counts so the power control system turns outlets OFF faster when less power is available. Since power demand and available power can change dynamically, this intelligent load detection mechanism within the power controller system can navigate these ever-changing situations.

Another aspect of the invention includes a method for monitoring power received from one or more input power sources, such as PV panels, and controlling power output to one or more loads. The method includes taking a power controller having an inverter, a microcontroller unit (MCU), and one or more voltage testing units, such as volt meters, ADCs, or multimeters, configured to determine the amount of voltage available from the power input source. The MCU is specially programmed to communicate with the other components and help carry out the steps of the method described herein. A predetermined minimum threshold input voltage value is assigned by the system or a user. In one embodiment the predetermined value is the number of Volts corresponding to the MPP of the input power source as assigned by the vendor/manufacturer. The system determines whether there is enough available power to power the load by measuring only input voltage and comparing the input voltage to the predetermined minimum threshold voltage. In the event the input voltage is greater than the threshold voltage value, then the system begins or continues to deliver power to the load. In the event that the load is greater than the available power, the input voltage will drop below the threshold voltage value exceeding the MPP and the MCU will instruct the system to not deliver power to the one or more loads. The system continues to determine the amount of voltage available from the PV panels. The system turns power back ON to the AC load(s) after the available power is more than the power needed (i.e., after the measured input voltage is at or above the acceptable minimum threshold voltage value).

In one embodiment, the system will only turn AC power back ON after determining that two or more of the following conditions are met: (1) the power available is more than the power needed; (2) available power must be at or above a certain minimum threshold value, such as 160 VDC in one embodiment, for a period of time determined by a counter. The counter is programmed to wait a predetermined number of counts before turning the AC power back ON to help ensure the available voltage is consistently available. The number of counts per unit of time (second or minute) is dependent on the amount of available power (as measured by comparing the input voltage to the minimum threshold voltage). Higher available power equals more counts, so the amount of time to turn the AC power back ON is less if more power is available.

DETAILED DESCRIPTION

Figure 1:
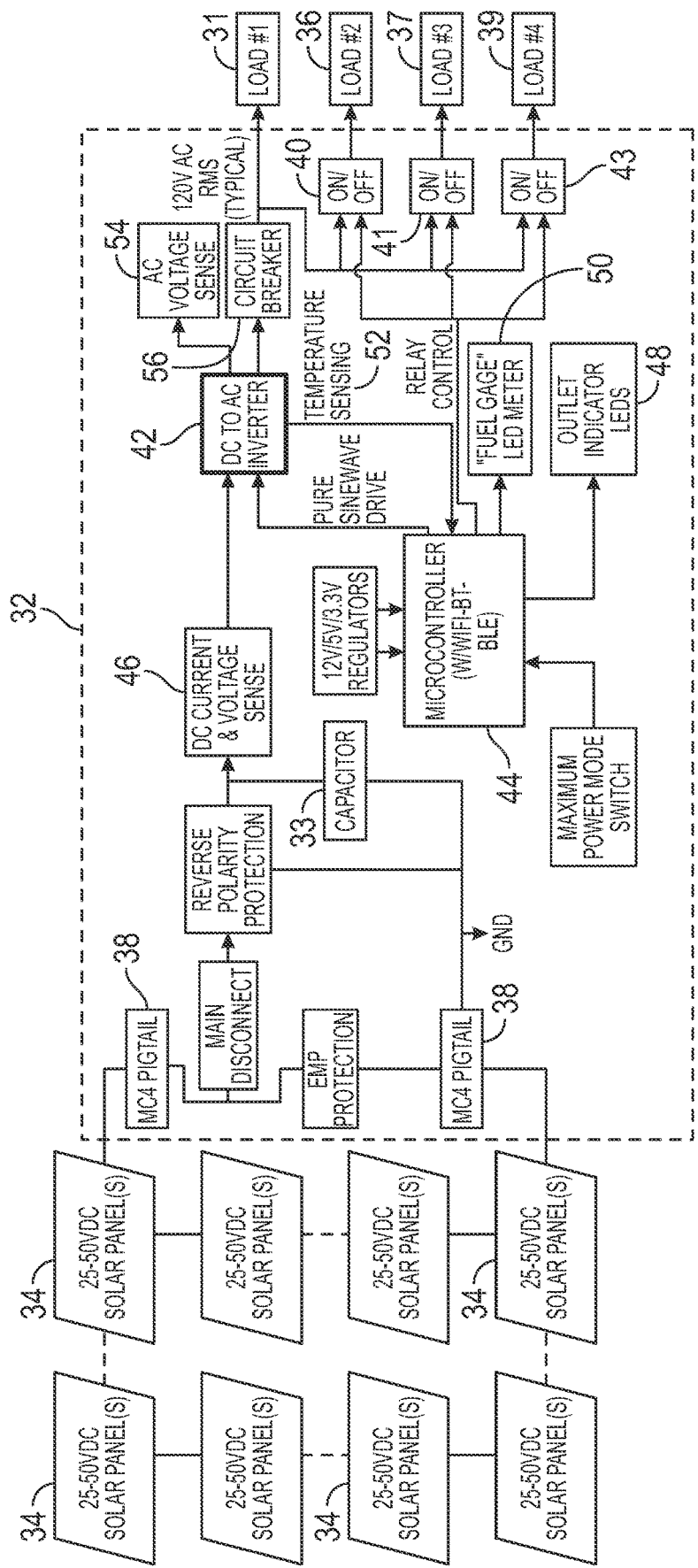
FIG. 1 is a system diagram showing the components of an exemplary power controller system.

The disclosure generally relates to a power controller system 32 for monitoring power received from one or more photovoltaic (PV) panels 34 and controlling power output to one or more loads 31, 36, 37, 39. For convenience, this disclosure primarily describes the input power source as being DC power obtained from PV panels 34, however, the power controller 32 described and claimed herein may be used with other types of DC input power sources, including wind power sources and hydroelectric power sources. Further, the load(s) 31, 36, 37, 39 may be any suitable device, including a storage battery, an AC power outlet, an electrical tool, an air conditioner or heater, a charger for electrical vehicles, or the like. It should be noted that in some embodiments the system 32 does not include a battery to store power. Instead, the system 32 only provides on-demand power when power is being provided by the DC input power source 34 (e.g., only during the daylight hours when the input power source is PV panels 34).

FIG. 1 shows the power controller system 32 configured to receive DC power from one or more input power sources 34, such as photovoltaic panels, through one or more power input connections 38. The system 32 includes one or more inverters 42 for converting the DC voltage from the PV panels 34 to AC voltage. The inverter(s) 42 may be a DC to AC pure sine wave output 120 VAC power inverters. The power controller system 32 includes output connections 40, 41, 43 for delivering AC power to one or more loads 36, 37, 39 through the one or more power output connections 40, 41, 43 which may be sockets, receptacles, or outlets. In the embodiment shown, the load #1 31 does not have a separate output connection. Instead, the load #1 31 is connected directly to the circuit breaker and is turned ON and OFF by turning the inverter 42 ON and OFF. In other words, if the input voltage is too low to power any loads 31, 36, 37, 39, then the inverter 42 is turned OFF such that no power is delivered to the load #1 31. In this embodiment the power output connection for load #1 is the inverter 42 or other suitable component. In other embodiments, all of the loads 31, 36, 37, 39 have similar output connections 40, 41, 43.

The system 32 includes a central processing unit (CPU) which may be a microcontroller unit (MCU) 44 having a processor unit, memory modules, communication interfaces, and peripherals. However, any other suitable CPU may be used. The processor unit performs operations and executes the functions of the code with the MCU 44. The memory module stores the executable code in flash memory. The communication interface provides a serial output for monitoring the system and the peripherals relate to the input voltages and signals as well as the output voltage or signals in the system 32. The MCU 44 is specially configured and programmed to communicate with the other components and help carry out the steps of the method described herein. It should be noted that the terms "MCU" 44 and "system" 32 are sometimes used interchangeably herein when describing the logic of the device and certain actions taken by the device. One or more voltage testing units 46, such as volt meters or multimeters, are configured to determine the amount of voltage available from the input power source 34. In one embodiment the MCU 44 includes an analog-to-digital (ATD) component for determining available voltage. The voltage testing unit(s) 46 communicate(s) the information to the MCU 44 which turns output power to the load(s) 31, 36, 37, 39 ON and OFF as described below in more detail. The load(s) 31, 36, 37, 39 are turned OFF if the MCU 44 determines the available power from the input power source 34 is less than the demand output power required by the one or more loads 31, 36, 37, 39 as described below in more detail. The voltage testing unit(s) 46 is also used in combination with sine wave generator firmware to reduce the output AC voltage to 120V if the panel DC voltage is higher than required to generate a 120V output. The voltage testing unit(s) 46 adds an additional layer of over-current protection to that provided by the circuit breakers 56 on each of the output circuits.

In some embodiments the system 32 has two panel mount switches, one will turn OFF the AC output power at the output connections/outlets 40, 41, 43, while the second switch will disconnect power from the entire system by shutting OFF the input power source. Due to the system having capacitors 33 charged within the system 32, the system 32 may require the second power input switch to be OFF for several seconds so that the capacitors 33 are discharged by the load 31, 36, 37, 39 presented from the output of the internal monitoring circuitry.

In some embodiments the system 32 has a temperature sensing unit 52 configured to measure the temperature of power consuming components and communicate the information to the MCU 44. As increased power is delivered to the outlets 40, 41, 43, the temperatures may approach unsafe values, especially if the ambient temperature around the inverter 42 is particularly high. In that case, the microcontroller 44 reduces power supplied to outlets 40, 41, 43 by sequentially turning OFF outlets 40, 41, 43 until the temperatures return to predetermined safe levels.

In some embodiments the system 32 has an AC voltage sensor 54 configured to monitor the output signal to verify a sine wave is being output by the inverter 42. If a sine wave is not being output, then there is likely a component failure in the inverter circuitry that would alter that expected waveform.

Figure 2:
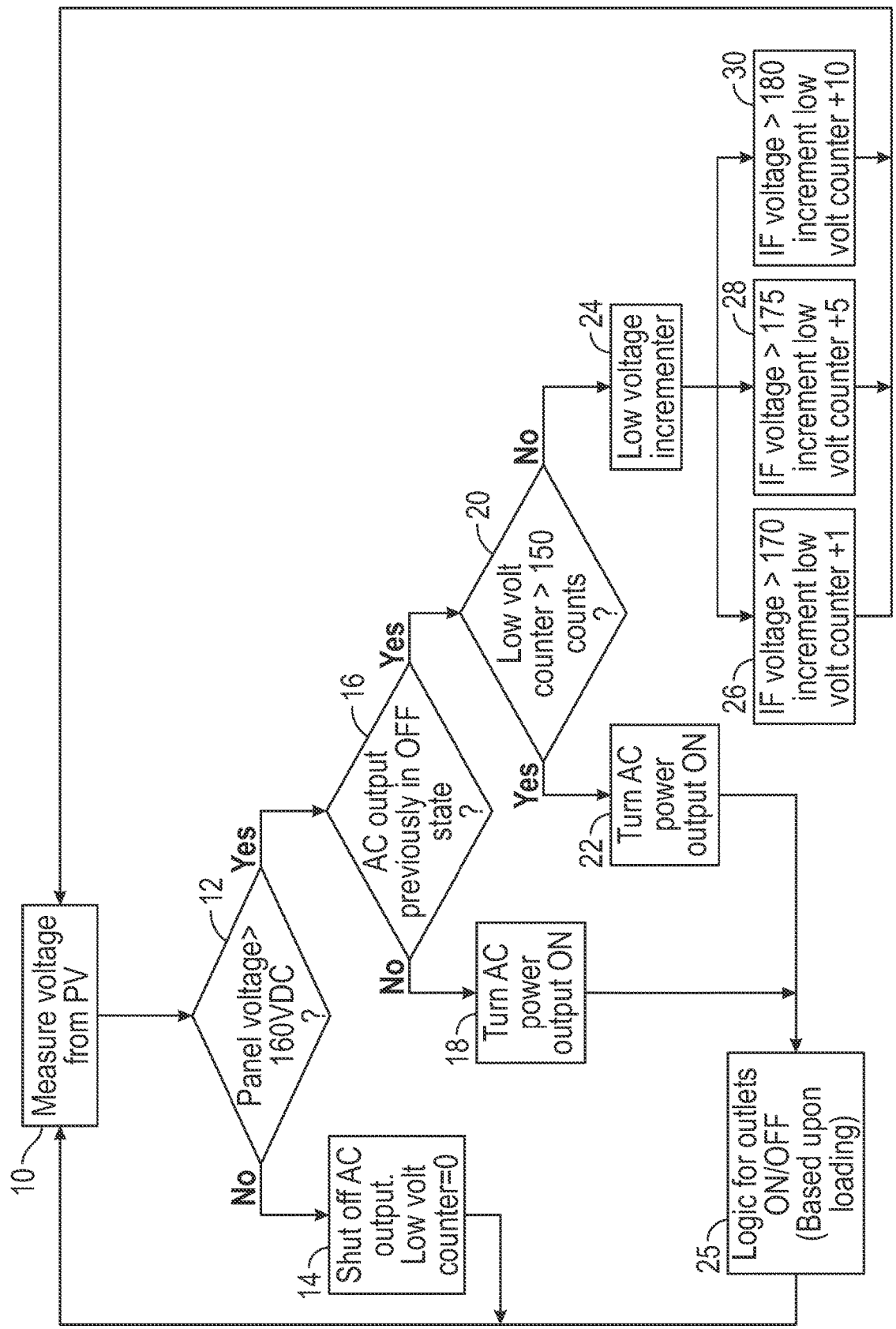
FIG. 2 is a flow chart showing the logic used to control the exemplary power controller system.

FIG. 2 shows one embodiment of the logic of the power controller 32. When the power controller 32 is turned ON, the voltage testing unit 46 begins to monitor the voltage available from the input power source 34 as shown in box 10. The system (using the MCU 44) determines whether the available voltage is greater or less than a predetermined threshold voltage value in box 12. In one embodiment, the predetermined threshold value is the number of Volts corresponding to the MPP of the input power source as assigned by the vendor/manufacturer. In this embodiment the MPP is not measured by the system, instead, it is determined by the vendor/manufacturer and the number Volts corresponding to the MPP is considered the threshold minimum for providing power to the loads. In the embodiment shown, this number is 160 Volts, however, the number may change based on the MPP of the input power source 34 (solar panels in this example). Comparing the predetermined threshold voltage value to the available voltage, the system can determine whether there is enough input power to power the load(s) 31, 36, 37, 39. If the available voltage is below the predetermined threshold voltage value, then the MPP is exceeded and the system turns OFF the AC power output to the load(s) 31, 36, 37, 39 as shown in box 14. However, if the available voltage is above the predetermined threshold voltage value and the system is currently providing power to the load 36, then the system continues to provide power to the load 36 as shown in box 18.

In addition to the general logic described above, FIG. 2 shows the logic of an embodiment for turning the power to the load(s) 31, 36, 37, 39 back ON after it was previously turned OFF due to the MPP being exceeded, perhaps because a cloud passed in front of the sun lowering the irradiance. In this embodiment, the system will only turn AC power back ON after determining that two or more of the following conditions are met: (1) the power available is more than the power needed; (2) available power must be at or above a certain minimum threshold value, such as 160 VDC in one embodiment for a period of time determined by a counter. A low voltage incrementer (or volt counter) is part of the logic/code within the MCU 44. The MCU 44 is programmed to assign a certain number of counts to certain values of available voltage over a certain time. For example, the available voltage may be measured once every second in box 10. At each measurement the low voltage incrementer assigns a certain count to the measurement and stores the value of the current count, as shown in box 24. The MCU 44 only turns the system back ON after a certain number of counts is reached. A higher amount of available voltage receives a larger number of counts such that the system will turn back ON faster if higher available voltage readings are determined. This system helps ensure there is enough irradiance to power the load(s) 31, 36, 37, 39 over a period of time so that low voltage brown-out conditions do not occur to the output load(s) 31, 36, 37, 39.

As shown in boxes 12 and 14, if the available voltage drops below the predetermined threshold amount (e.g., 160V), the AC output is turned OFF. Then, the voltage must rise consistently above 170V before the system attempts to turn the AC output ON again. The amount of time to turn the AC output back ON is dependent upon a counter and the amount of available voltage measured. More specifically and with reference to FIG. 2, if the voltage testing unit determines that the MPP is not exceeded (available voltage is greater than 160V in the current example), but the AC output was previously OFF, then the system will only turn ON after the low voltage incrementer counts at least 150 counts, as shown in box 20. Boxes of 26, 28, and 30 show different count values being assigned and recorded depending on the measurement of available voltage in step 10. Box 26 assigns one count to input voltage between 170-175, box 28 assigns five counts to input voltage between 175 and 180, and box 30 assigns ten counts to voltage above 180. Voltage below 170 does not receive any counts. If, at any time the predetermined threshold voltage value (e.g., 160) is not met or exceeded in box 12, the number of counts returns to zero and the process of accumulating counts starts over as shown in box 14. In an illustrative example, if the system is turned OFF due to the MPP being exceeded (box 14), and immediately thereafter the available voltage measured by the voltage testing unit 46 is 170V, it would take 150 seconds or two minutes thirty seconds for the system to turn back ON (assuming a voltage measurement of 170V and one count every second). In other embodiments the MCU 44 can be programmed to measure voltage at different intervals of time, to assign different numbers of counts to different available voltage amounts, and to turn AC power back ON after any suitable number of counts is reached.

Using the logic described above, there are generally two scenarios in which the system 32 will not be able to supply power to the output. The first is if the irradiance (sun power) is gradually reduced. For example, due to the sun slowly setting at the end of the day. The second is if the output power load(s) 31, 36, 37, 39 is (are) suddenly greater than the available input power (overload). For example, if a dark cloud (or other shadow) suddenly covers the sun. When the system 32 has experienced either of these situations, a visual indicator 48, such as an orange LED, will flash until the available power has returned to an acceptable level. The system intelligently distinguishes between the two scenarios. When the input voltage drops below 160 VDC, the system will shut OFF the 120 VAC output for a period. This OFF period will be dependent on the reaction of the input voltage when the output load is removed from the system.

For the first scenario, when a gradual reduction of input voltage (sun power) occurs, the available power may not return for a long period of time and when the sun power does return, the irradiance level will not be very powerful as the sun slowly rises the next morning. Therefore, the voltage will most likely not return to higher voltage levels until the sun power improves. When the first scenario occurs, the system will shut OFF output power for a predetermined period, for example around 5 minutes. If the orange LED is illuminated after the predetermined period, the MCU 44 will try to power the output load back ON. If the irradiance level to the input increases and the input voltage increases to a higher level, the system will shorten this five-minute period dynamically based upon the reaction of the input voltage. If not, the system 32 will periodically check input voltage, but only periodically.

For the second scenario, when a sudden overload condition is present, the output will be powered OFF. In this situation when the available irradiance is high again (such as when the sun comes back from behind the cloud), the input voltage will rise quickly and most likely illuminate the green LED. When this happens, the predetermined (e.g., five-minute) time period may be reduced to approximately two minutes before the system attempts to repower the output because the number of counts will be higher, as described herein.

As shown in FIG. 1, some embodiments include multiple output connections/outlets 40, 41, 43 for connecting different loads 36, 37, 39 to the system 32. FIG. 1 shows three outlets 40, 41, 43, but any suitable number of outlets may be used. As described above, the inverter 42 serves to turn power ON/OFF for the first load 31. The multiple outlets 40, 41, 43 communicate with the MCU 44. In one embodiment, the MCU 44 is programmed to prioritize power to each load 31, 36, 37, 39 so power is provided to each load 31, 36, 37, 39 one at a time in a predetermined order if there is enough available power, as represented in box 25 of FIG. 2. The system 32 turns ON the power to the loads 31, 36, 37, 39 in the predetermined order of priority (highest priority first), then works in reverse when available power drops or loads increase to turn OFF power in reverse order of priority (lowest priority first). For example, the first load 31 may have the highest priority, then the second load 36, then the third load 37, and finally the fourth load 39. If a cloud casts a shadow on the solar panels 34, the system 34 may decide to turn OFF the power to the third and fourth loads 37, 39, but keep supplying power to the first and second load 31, 36. In this way, the system 32 will turn OFF power to the loads that are less important while keeping power to more important loads/outlets instead of turning OFF power to all of the load 31, 36, 37, 39 at once. The logic used to turn the load 31, 36, 37, 39 ON and OFF is similar to the logic described above, except the voltage thresholds and number of counts is different for each of the multiple load 31, 36, 37, 39. In some embodiments, the logic shown in FIG. 2 is used to turn ON each successive load 31, 36, 37, 39. In other words, the counts required to turn ON each additional outlet restart at zero and must reach the predetermined number of counts (150 as shown) in order to turn ON power to the next load 31, 36, 37, 39 in the lower rank of priority.

Figure 3:
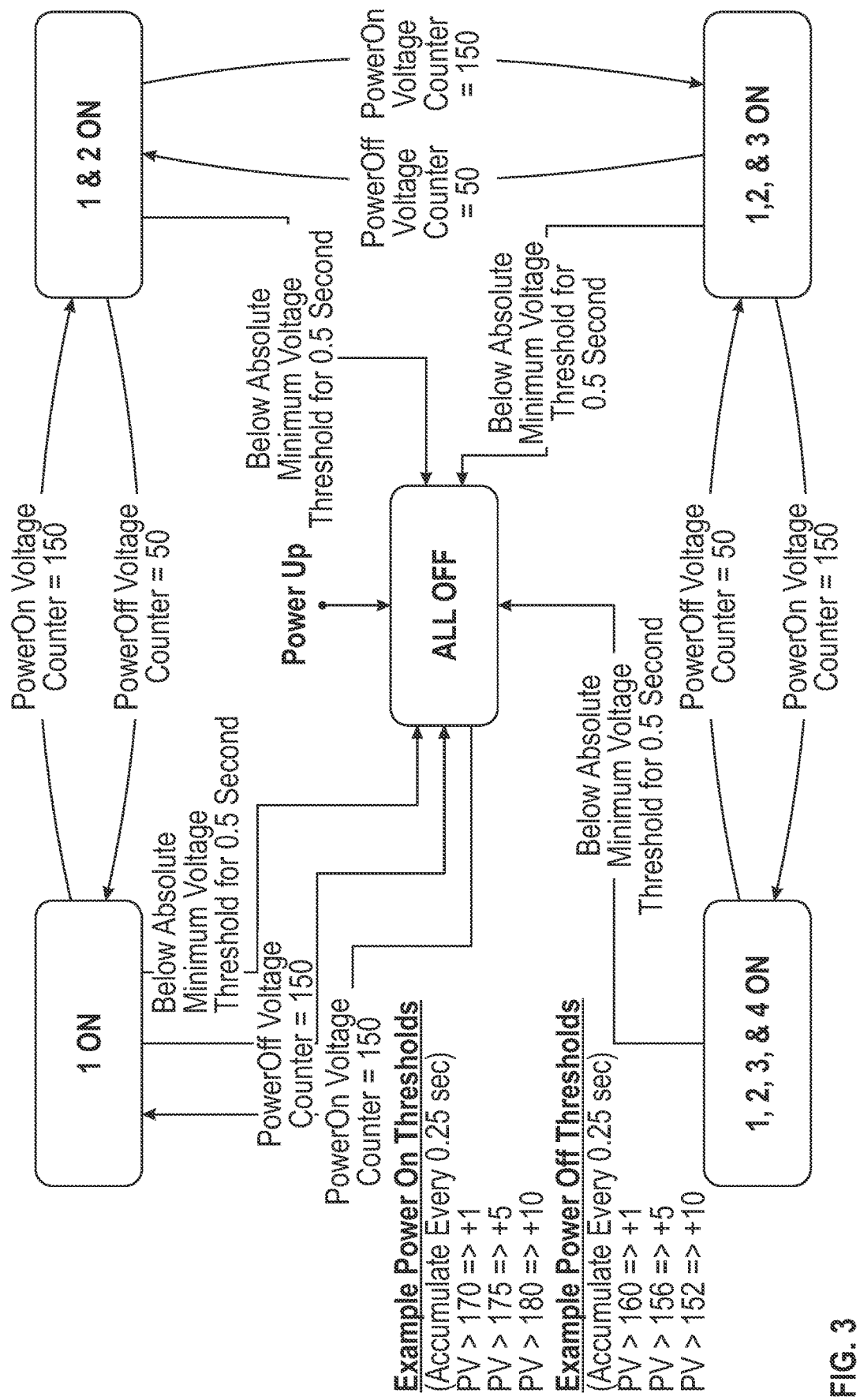
FIG. 3 is a flow chart showing the logic used to turn ON and OFF multiple loads.

FIG. 3 shows one embodiment of the logic used to turn ON and OFF power to one or more outlets 40, 41, 43. The logic shown in FIG. 3 is similar to the logic shown in FIG. 2, except FIG. 3 shows the logic used to turn ON and OFF four outlets in decreasing order of priority (i.e., where the first outlet has the highest priority and the fourth outlet has the lowest priority). The logic shown in FIG. 3 may be applied to any suitable number of outlets 40, 41, 43. As shown, the voltage counter resets to zero upon state transitions and power up. The power ON voltage counters accumulate based upon solar panel voltage being above certain predetermined minimum thresholds, with higher thresholds accumulating faster. In this illustrative example, the voltage counter assigns one count to input voltage between 170-175, five counts to input voltage between 175 and 180, and ten counts to voltage above 180. The counts required to turn ON each additional outlet restart at zero and must reach the predetermined number of counts (150 as shown) in order to turn ON the next outlet 40, 41, 43 having the immediately lower rank of priority. The MCU 44 also turns OFF outlets 40, 41, 43 (lowest priority outlets first) based on predetermined counts. The power OFF voltage counters accumulate based upon solar panel voltage being below thresholds, with lower thresholds accumulating faster. In this example, fifty counts are required to turn OFF an outlet 40, 41, 43. The voltage counter assigns one count to voltage between 160-170, five counts to voltage between 160 and 156, and ten counts to voltage below 152. If, at any time the input voltage is below the absolute minimum voltage threshold for more than a predetermined amount of time (0.5 seconds in this example), then all outlets 40, 41, 43 are turned OFF and the logic starts over. Thresholds and accumulation rates subject to continued tuning with large sampling of panels. Once tuned/optimized, thresholds and accumulation rates are adjusted based upon measured PV open-circuit voltage at power-up.

Some embodiments include a maximum power mode. The maximum power mode eliminates all logic related to prioritizing load 31, 36, 37, 39. All power outlet staging is functionality is turned off and the load 31, 36, 37, 39 are driven by the inverter 42 so long as the voltage at the panels 34 is able to maintain a specified minimum AC voltage, for example 105V. The maximum power mode may be used in situations where the system 32 has not been specifically tuned to work with the specific brand or configuration of panels 34 and the user simply wants to draw output power to the loads 31, 36, 37, 39 regardless of any predetermined voltage values. For example, the system may be programmed to turn power to loads three 37 and four 39 OFF at a certain input voltage value for a particular first type and size of solar panels 34. However, if a second type or size of solar panel 34 is connected to the system, the second type or size of panel 34 may be providing plenty of power to keep loads three 37 and four 39 ON. In this case, the user may select the maximum power mode to ensure the system 32 continues providing power unless or until an extremely low amount of input voltage is detected (e.g., 105V).

The power controller system 32 may also include an indicator 48, such as colored LED lights, to visually indicate whether the PV panels 34 are currently providing enough power to power the load(s) 31, 36, 37, 39. Each load 31, 36, 37, and 39 may have a separate indicator 48 so the user knows which loads 31, 36, 37, 39 are currently receiving power.

Figure 4:
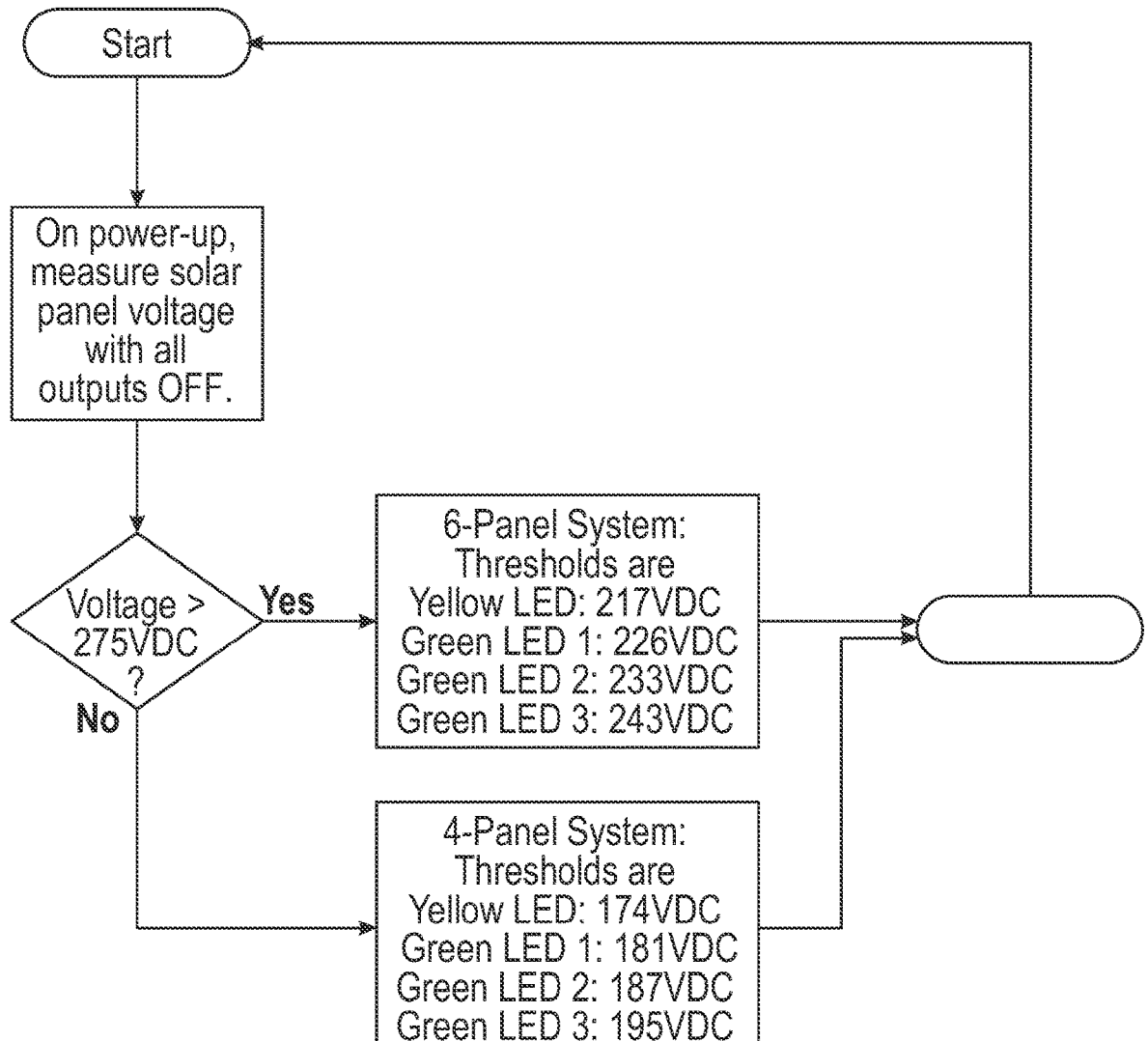
FIG. 4 is a flow chart showing the logic used for the LED meter voltage thresholds.

The power controller system 32 may also include a LED meter 50, which functions as a fuel gauge to communicate the amount of input power that is being produced. The LED meter 50 may have multiple shades of LED lights to indicate the amount of available power. In one embodiment, a green LED could indicate enough power to power the load(s) 31, 36, 37, 39. Orange could indicate there is enough power, but the available power is low (e.g., voltage is between about 160-170V in the examples given below). Red could indicate that there is not enough available power to power the load(s) 31, 36, 37, 39 (e.g., voltage is below about 160V in the examples given below). FIG. 4 shows one embodiment of the logic used to activate the various LEDs of the LED meter 50. The voltage testing unit(s) 46 measure the input voltage with all outlets 40, 41, 43 turned OFF so that no load is drawing power from the system 32. The LED meter 50 then illuminates one or more LEDs based on the input voltage to indicate the amount of voltage being drawn from the PV panels.

Figure 5:
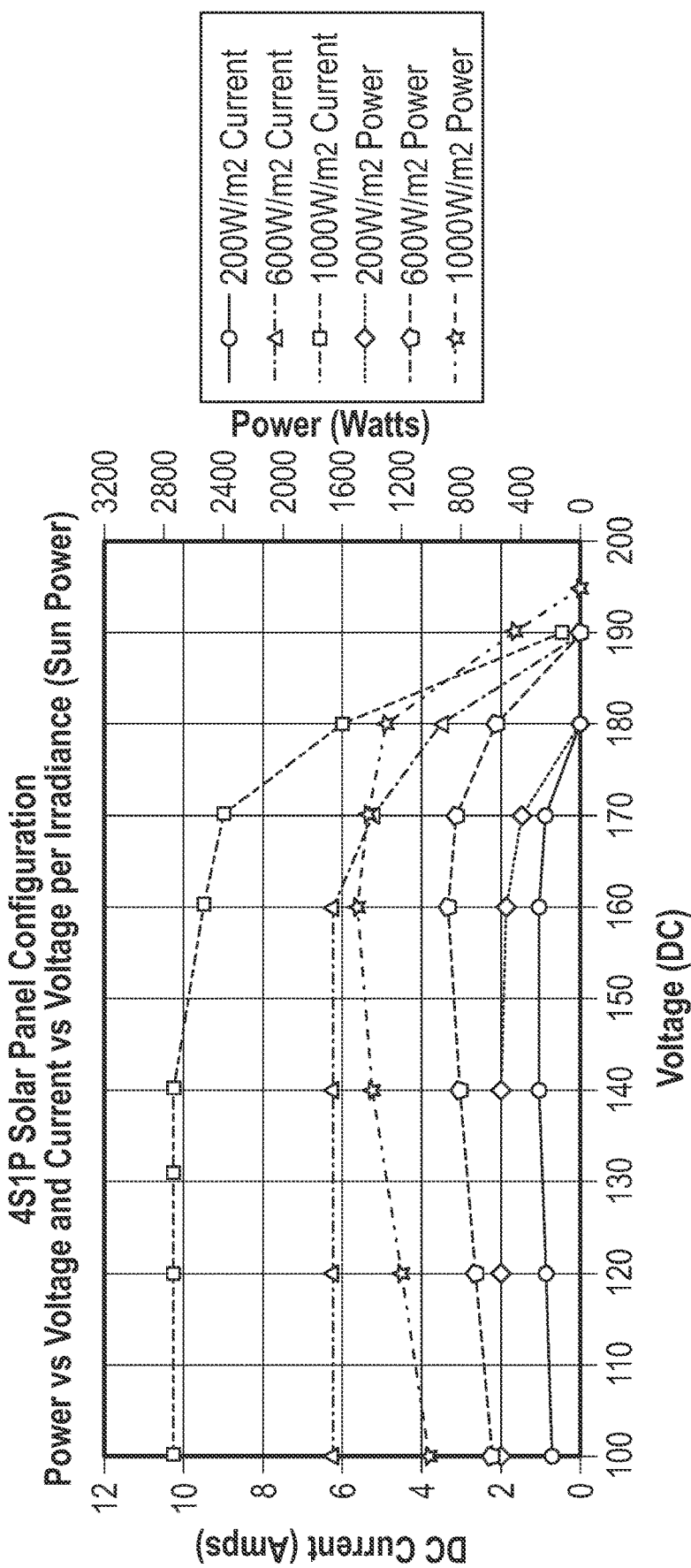
FIG. 5 is a graph showing the Maximum Power Point (MPP) for an exemplary four series (four panel) PV panel system.

FIG. 5 shows an exemplary four panel configuration wherein the panels are configured in a series arrangement. Each panel has a maximum output of 50V for the system to operate. As described above, the voltage under load must be greater than 160 VDC for the system to operate. During some testing, sun power was typically measured around 440 W/m$^2$. Some peaks were upwards toward 700 W/m$^2$. Using the chart shown in FIG. 5, the maximum AC output current will be around 4 Amps when irradiance is at 440 W/m$^2$ (about halfway between the 200 W/m$^2$ current line and the 600 W/m$^2$ line at 160V on the x-axis). As shown, if more sun power was available, the exemplary system could output more current and power.

Figure 6:
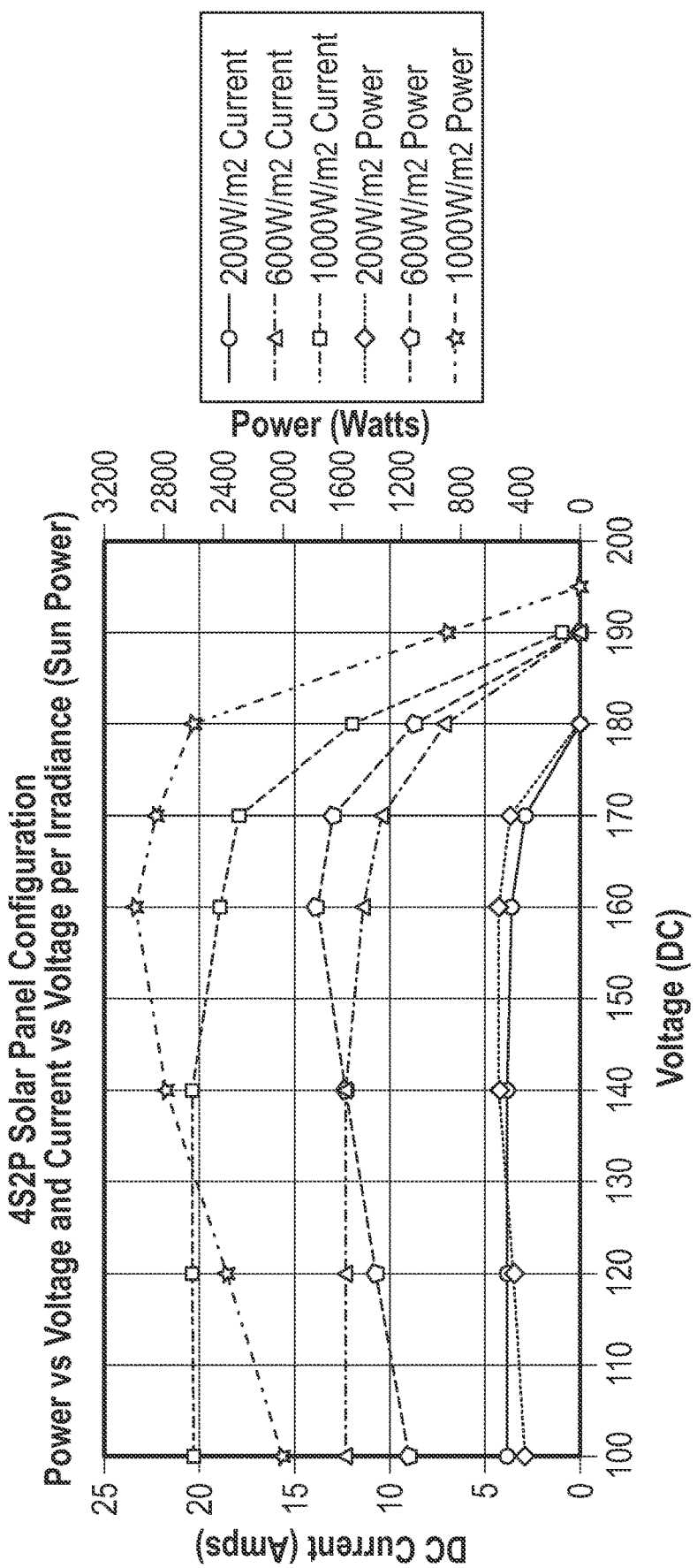
FIG. 6 is a graph showing the Maximum Power Point (MPP) for an exemplary four series and two parallel (eight panel) PV panel system.

FIG. 6 shows an exemplary eight panel configuration wherein the panels are configured with 4 in series and 2 in parallel. Each panel has a maximum output of 50V for the system to operate. The voltage under load must be greater than 160 VDC for the system to operate. Using the chart shown in FIG. 6, the maximum AC output current will be around 8 amps with 400 W/m$^2$ of irradiance (about halfway between the 200 W/m$^2$ current line and the 600 W/m$^2$ line at 160V on the x-axis). As shown, if more sun power was available, the exemplary system could output more current and power.

Having thus described the invention in connection with the preferred embodiments thereof, it will be evident to those skilled in the art that various revisions can be made to the preferred embodiments described herein without departing from the spirit and scope of the invention. It is my intention, however, that all such revisions and modifications that are evident to those skilled in the art will be included with in the scope of the following claims.

What is claimed is as follows:
1. A power controller system comprising:
a central processing unit (CPU);
a voltage testing unit configured to communicate with an input power source and the CPU, said voltage testing unit configured to determine an input voltage available from the input power source;
an inverter for converting DC voltage from the input power source to AC voltage;
wherein the CPU is programmed to determine whether the input voltage available from the input power source exceeds a predetermined threshold voltage value, and if so, the CPU is programmed to provide available power to one or more power output connections,
wherein the power output connections are configured to deliver AC power to one or more loads,
wherein the one or more power output connections include a first power output connection having a first priority, a second power output connection having a second priority, a third power output connection having a third priority, and a fourth power output connection having a fourth priority, so that: (i) power is turned ON to each of the one or more power output connections one at a time in a predetermined order of priority; and (ii) power is turned OFF to each of the one or more power output connections one at a time in a reverse predetermined order of priority.

2. The power controller system of claim 1 wherein the CPU is programmed to provide available power to the one or more power output connections if the input voltage exceeds the threshold voltage value after a predetermined number of counts.

3. The power controller system of claim 2 wherein the CPU is programmed to assign a first number of counts to a first input voltage and a second number of counts to a second input voltage, wherein the first input voltage is larger than the second input voltage and the first number of counts is greater than the second number of counts.

4. The power controller system of claim 1 further comprising a visual indicator in communication with the CPU to visually indicate an amount of input voltage being generated by the input power source, wherein the visual indicator includes a first light which is illuminated when the amount of voltage being generated is within a first range and a second light which is illuminated when the amount of voltage being generated is within a second range.

5. The power controller system of claim 1 wherein the power output connections are outlets.

6. The power controller system of claim 1 wherein the input power source is one or more photovoltaic (PV) cells.

7. The power controller system of claim 1 wherein the predetermined threshold voltage value is the number of Volts corresponding to the MPP of the input power source.

8. The power controller system of claim 1 wherein the CPU is a microcontroller unit (MCU) having a processor, memory modules, and a communication interface.

9. A method of monitoring an input voltage received from one or more input power sources and controlling power output to one or more power output connection, said method comprising:
taking a power controller system having an inverter, a central processing unit (CPU), and one or more voltage testing units;
measuring an input voltage from the one or more input power sources;
comparing the input voltage to a predetermined threshold input voltage value;
turning power to the one or more power output connections ON if the input voltage exceeds the predetermined threshold input voltage value so that power is turned ON to each of the one or more power output connections one at a time in a predetermined order of priority; and
turning power to the one or more power output connections OFF if the input voltage does not exceed the predetermined threshold input voltage value so that power is turned OFF to each of the one or more power output connections one at a time in a reverse predetermined order of priority.

10. The method of claim 9 further comprising continuing to measure the input voltage from the one or more input power sources after the power to the one or more power output connections has been turned OFF; and
turning power to the one or more power output connections ON after the input voltage exceeds a threshold voltage restart value for a predetermined number of counts.

11. The method of claim 10 wherein the predetermined threshold input voltage value is the same as the threshold voltage restart value.

12. The method of claim 9 wherein the power controller system further includes a counter and the method further comprises turning power to the one or more power output connections ON after the input voltage is greater than the predetermined threshold input voltage value for at least a predetermined number of counts, wherein a first number of counts is assigned to a first input voltage and a second number of counts is assigned to a second input voltage, wherein the first input voltage is larger than the second input voltage and the first number of counts is greater than the second number of counts.

13. The method of claim 9 further comprising assigning a first number of counts to a first input voltage and a second number of counts to a second input voltage.

14. The power controller system of claim 9 wherein the CPU is a microcontroller unit (MCU) having a processor, memory modules, and a communication interface.

15. A method of monitoring voltage received from one or more input power sources and controlling power output to a first power output connection and a second power output connection, said method comprising:
(a) taking a power controller system having an inverter, a central processing unit (CPU), one or more voltage testing units, and an incrementer configured to tally a total number of counts;
(b) measuring an input voltage from the one or more input power sources;
(c) determining whether the input voltage is above a predetermined threshold input voltage value, a first power ON voltage, and a second power ON voltage;
(d) storing a first count value if the input voltage is above the first power ON voltage and a second count value if the input voltage is above the second power ON voltage;
(e) resetting the total number of counts to zero if the input voltage does not exceed the predetermined threshold input voltage value;
(f) repeating steps (b), (c), (d), and (e) wherein the incrementer tallies the total number of counts;
(g) providing power to the first power output connection after the total number of counts reaches a predetermined number of counts.

16. The method of claim 15 further comprising resetting the total number of counts to zero while maintaining power to the first power output connection;
repeating steps ((b), (c), (d), (e), and (f) from claim 15 for the second power output connection;
providing power to the second power output connection after the total number of counts reaches a second predetermined number of counts.

17. The method of claim 15 further comprising turning power to the one or more power output connections OFF if the input voltage is less than the predetermined threshold input voltage value.

18. The method of claim 15 further comprising assigning a first power OFF voltage value, and a second power OFF voltage value;
storing a first count value if the input voltage is the first power OFF voltage and a second count value if the input voltage is the second power OFF voltage; and
turning power to the first power output connection OFF after the total number of counts reaches a predetermined number of counts.

19. The power controller system of claim 1 wherein the first priority is higher than the second priority, the second priority is higher than the third priority, and the third priority is higher than the fourth priority.

20. The power controller system of claim 19 wherein the predetermined order of priority is: first priority, then second priority, then third priority, then fourth priority; and the reverse predetermined order of priority is: fourth priority, then third priority, then second priority, then first priority.

* * * * *